(12) United States Patent
Fitzmaurice

(10) Patent No.: US 12,178,161 B2
(45) Date of Patent: Dec. 31, 2024

(54) SUGAR CANE HARVESTER FOR WHOLE CANE

(71) Applicant: Alan Lewis Fitzmaurice, Brisbane (AU)

(72) Inventor: Alan Lewis Fitzmaurice, Brisbane (AU)

( * ) Notice: Subject to any disclaimer, the term of this patent is extended or adjusted under 35 U.S.C. 154(b) by 257 days.

(21) Appl. No.: 17/109,640

(22) Filed: Dec. 2, 2020

(65) Prior Publication Data

US 2021/0169008 A1   Jun. 10, 2021

(30) Foreign Application Priority Data

Dec. 5, 2019   (AU) ............................... 2019904607

(51) Int. Cl.
| | |
|---|---|
| *A01F 12/44* | (2006.01) |
| *A01D 41/14* | (2006.01) |
| *A01D 45/10* | (2006.01) |
| A01D 61/00 | (2006.01) |
| C13B 5/04 | (2011.01) |

(52) U.S. Cl.
CPC ............ *A01F 12/44* (2013.01); *A01D 41/145* (2013.01); *A01D 45/10* (2013.01); *A01D 61/008* (2013.01); *C13B 5/04* (2013.01)

(58) Field of Classification Search
CPC ....... A01F 12/44; A01D 41/145; A01D 45/10; A01D 61/008
See application file for complete search history.

(56) References Cited

U.S. PATENT DOCUMENTS

| | | | |
|---|---|---|---|
| 2,755,912 A | 7/1956 | Ashton | |
| 3,673,774 A | 7/1972 | Mizzi | |
| 3,995,520 A * | 12/1976 | Spargo | A01D 45/10 83/345 |
| 4,098,060 A | 7/1978 | Quick | |
| 4,099,365 A * | 7/1978 | Hudson | A01D 45/10 56/16.6 |
| 4,121,778 A * | 10/1978 | Quick | A01D 45/10 56/16.5 |
| 4,270,337 A | 6/1981 | Pinto | |

(Continued)

FOREIGN PATENT DOCUMENTS

| | | | | |
|---|---|---|---|---|
| CN | 101690449 A | * | 4/2010 | ............. A01D 45/10 |
| CN | 103430696 A | * | 12/2013 | ............. A01D 45/10 |

(Continued)

*Primary Examiner* — Arpad Fabian-Kovacs
(74) *Attorney, Agent, or Firm* — Bonini IP Law, LLC; Frank J. Bonini, Jr.

(57) ABSTRACT

A harvester for infield collection of substantially whole cane comprising a drive unit, a removable billet thrower and chute and a feed and billeter module being a two row unit which may be inserted under the chassis and secured by pivot couplings to corresponding mounts. The harvester collects whole cane and throws billeted cane along with trash into an infield transporter which then transports this to a centralised trash separator. Single row modules align single row feed and billeting units may pivot independently of each other. Assemblies are arranged to float and follow the ground surface over which the harvester moves and to this end each of the assemblies is biased into floating contact with the ground by reason of one or more spring assemblies.

20 Claims, 17 Drawing Sheets

(56) References Cited

U.S. PATENT DOCUMENTS

| | | | | |
|---|---|---|---|---|
| 4,295,325 A | * | 10/1981 | Cannavan | A01D 45/10 56/61 |
| 4,343,140 A | | 8/1982 | Hegger | |
| 4,550,552 A | * | 11/1985 | Stiff | A01D 45/10 56/505 |
| 4,555,896 A | | 12/1985 | Stiff et al. | |
| 5,092,110 A | | 3/1992 | Dommert et al. | |
| 5,463,856 A | * | 11/1995 | Beckwith | A01D 45/10 460/134 |
| 6,363,700 B1 | | 4/2002 | Fowler | |
| 8,240,115 B2 | | 8/2012 | Marchini | |
| 9,763,386 B2 | * | 9/2017 | Holly | A01D 45/003 |
| 10,076,082 B2 | * | 9/2018 | Fattepur | A01F 29/095 |
| 10,986,779 B2 | * | 4/2021 | Lawn | A01D 45/10 |
| 2014/0174048 A1 | * | 6/2014 | Lawson | A01D 45/10 56/13.9 |
| 2014/0352272 A1 | * | 12/2014 | Parker | A01D 45/10 56/13.6 |
| 2015/0327437 A1 | * | 11/2015 | Mixon | A01D 45/10 241/235 |
| 2015/0362904 A1 | * | 12/2015 | Scrivner | A01D 41/127 700/275 |
| 2017/0000026 A1 | * | 1/2017 | Seki | A01D 34/661 |
| 2018/0338423 A1 | * | 11/2018 | Lucca | A01D 41/141 |
| 2018/0338426 A1 | * | 11/2018 | Seki | A01D 67/00 |
| 2019/0008092 A1 | * | 1/2019 | Bertino | A01D 45/10 |
| 2019/0037770 A1 | * | 2/2019 | Dugas | A01F 12/444 |
| 2020/0128742 A1 | * | 4/2020 | Richard | A01D 45/10 |
| 2020/0337235 A1 | * | 10/2020 | Blank | A01M 21/043 |

FOREIGN PATENT DOCUMENTS

| | | | | |
|---|---|---|---|---|
| CN | 102640620 B | * | 9/2014 | A01D 45/10 |
| CN | 106385983 A | * | 2/2017 | A01D 45/10 |
| CN | 110050577 A | * | 7/2019 | A01D 43/00 |
| CN | 111386846 A | * | 7/2020 | A01D 67/00 |
| CN | 113179755 A | * | 7/2021 | A01D 57/22 |
| CN | 116868757 A | * | 10/2023 | A01D 45/10 |
| DE | 2933123 A | * | 3/1980 | A01D 45/10 |
| JP | 2009261273 A | * | 11/2009 | A01D 45/10 |
| WO | WO-9301707 A1 | * | 2/1993 | A01D 45/10 |
| WO | WO-9962324 A1 | * | 12/1999 | A01D 45/10 |
| WO | WO-2013003924 A2 | * | 1/2013 | A01D 45/10 |
| WO | WO-2014138831 A1 | * | 9/2014 | A01D 45/10 |
| WO | WO-2019056080 A1 | * | 3/2019 | A01D 43/08 |
| WO | WO-2020232522 A1 | * | 11/2020 | A01D 45/10 |
| WO | WO-2020232523 A1 | * | 11/2020 | A01D 45/10 |
| WO | WO-2021016689 A1 | * | 2/2021 | A01D 45/10 |
| WO | WO-2022016249 A1 | * | 1/2022 | A01D 45/003 |

* cited by examiner

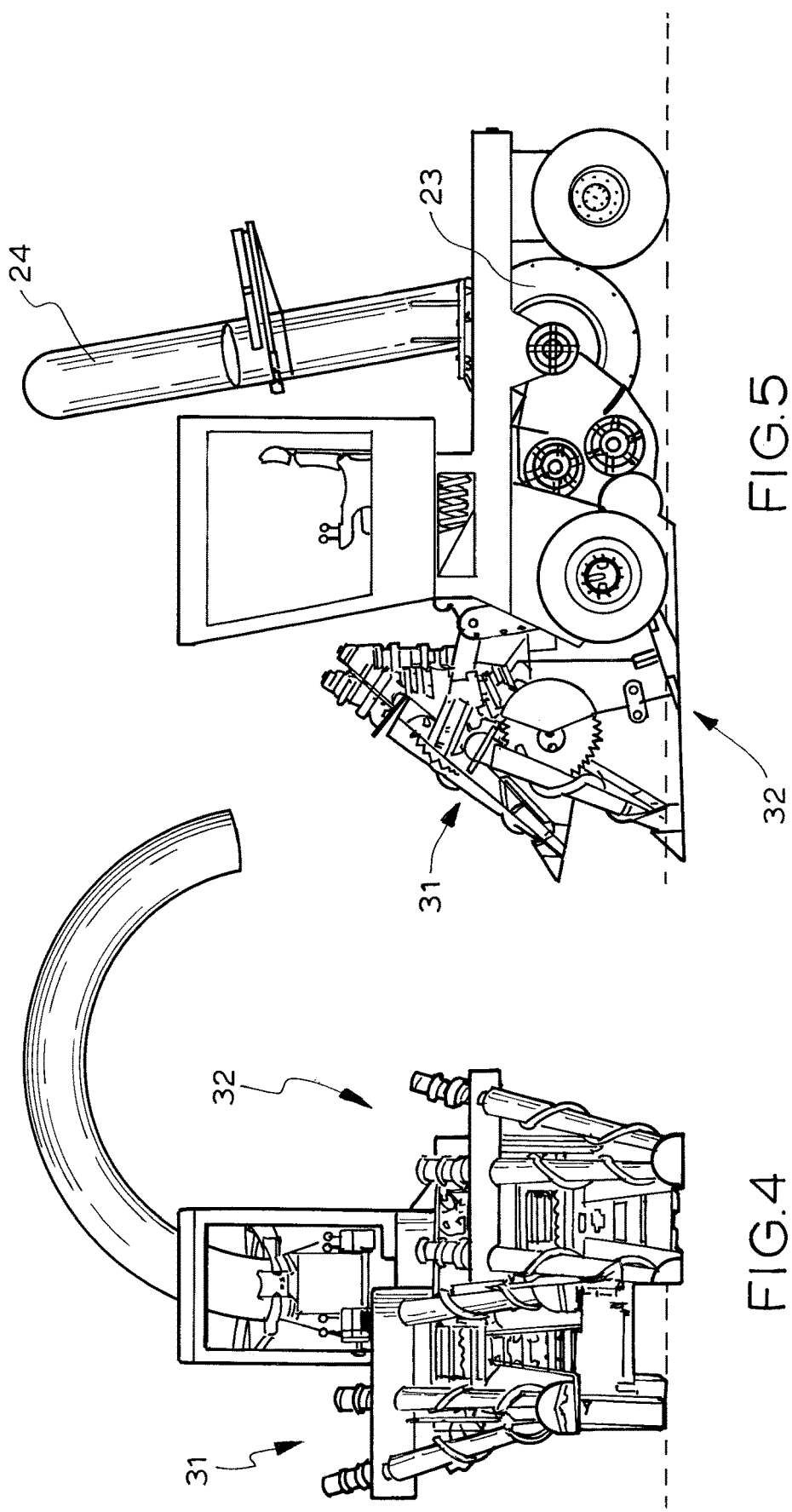

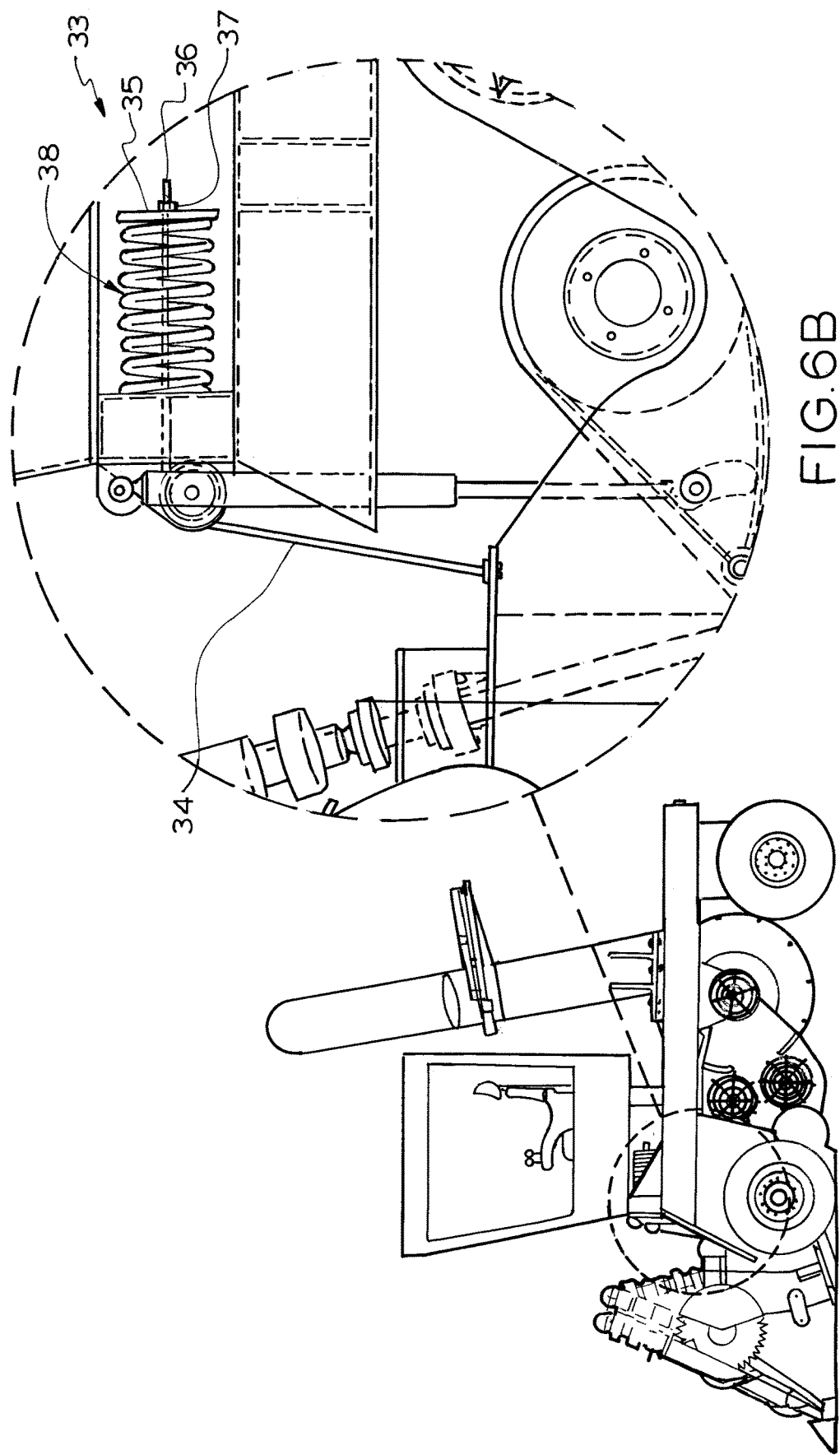

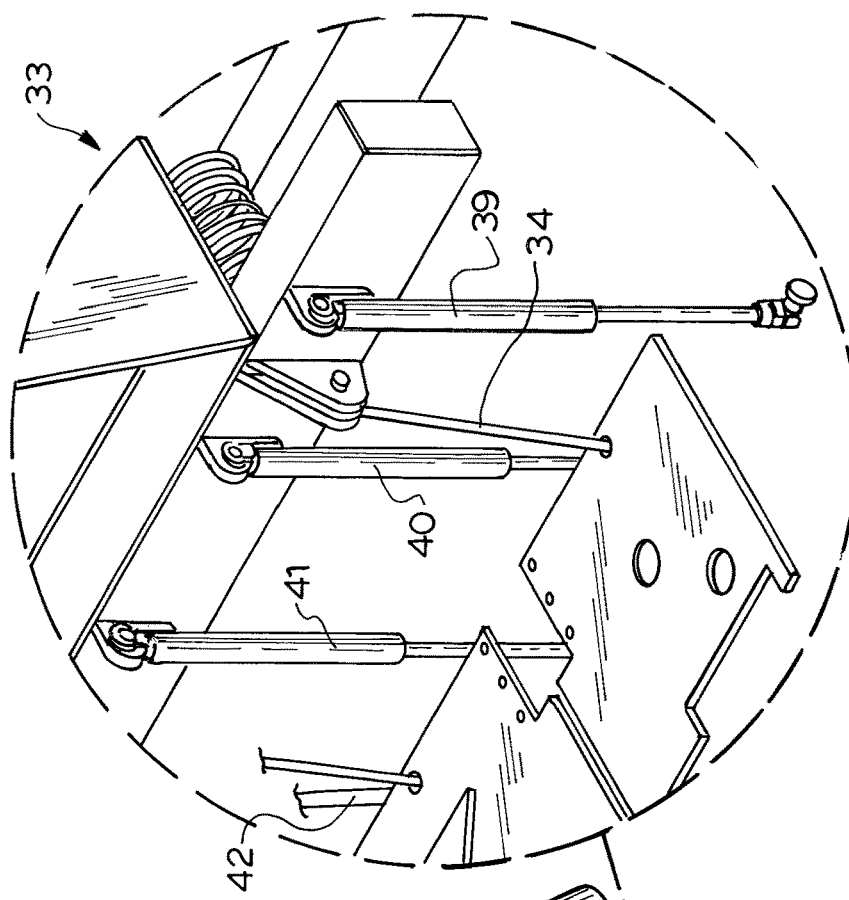
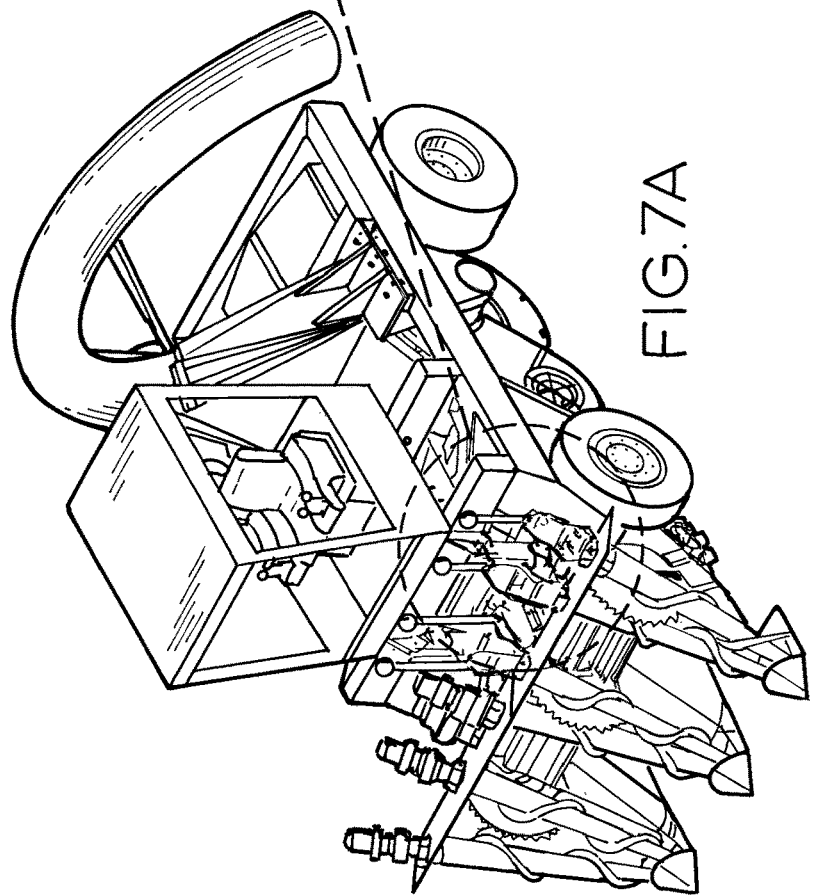

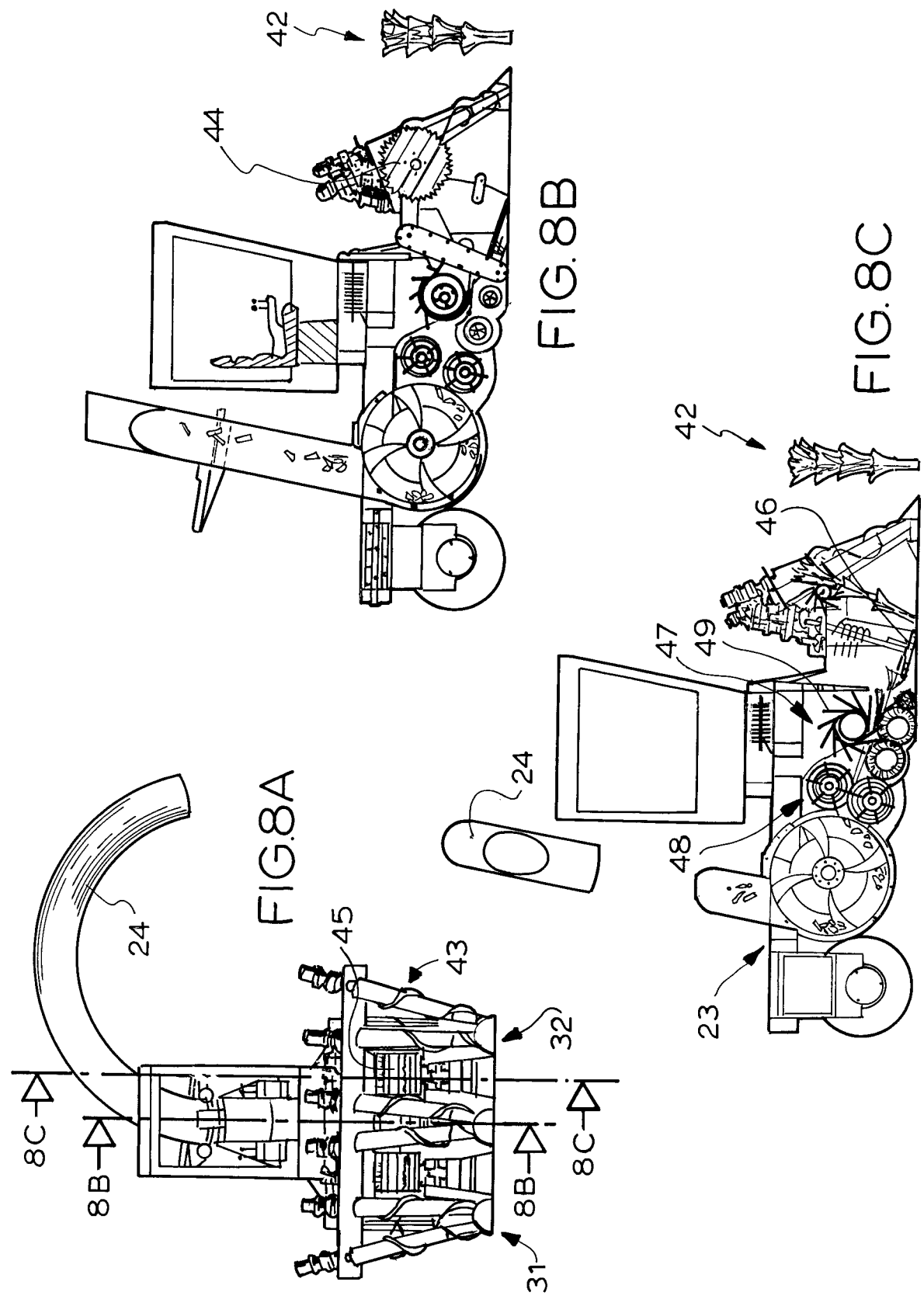

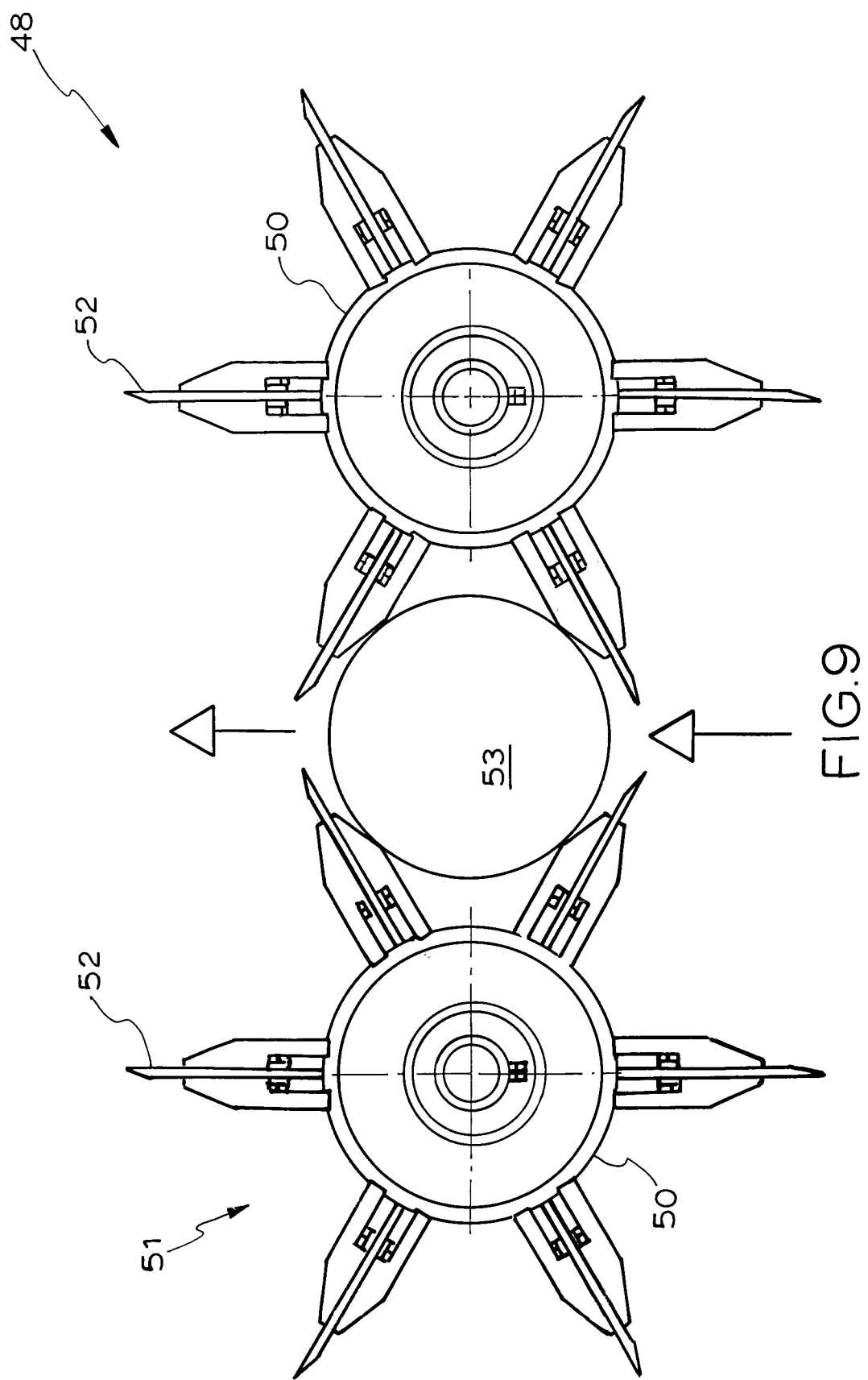

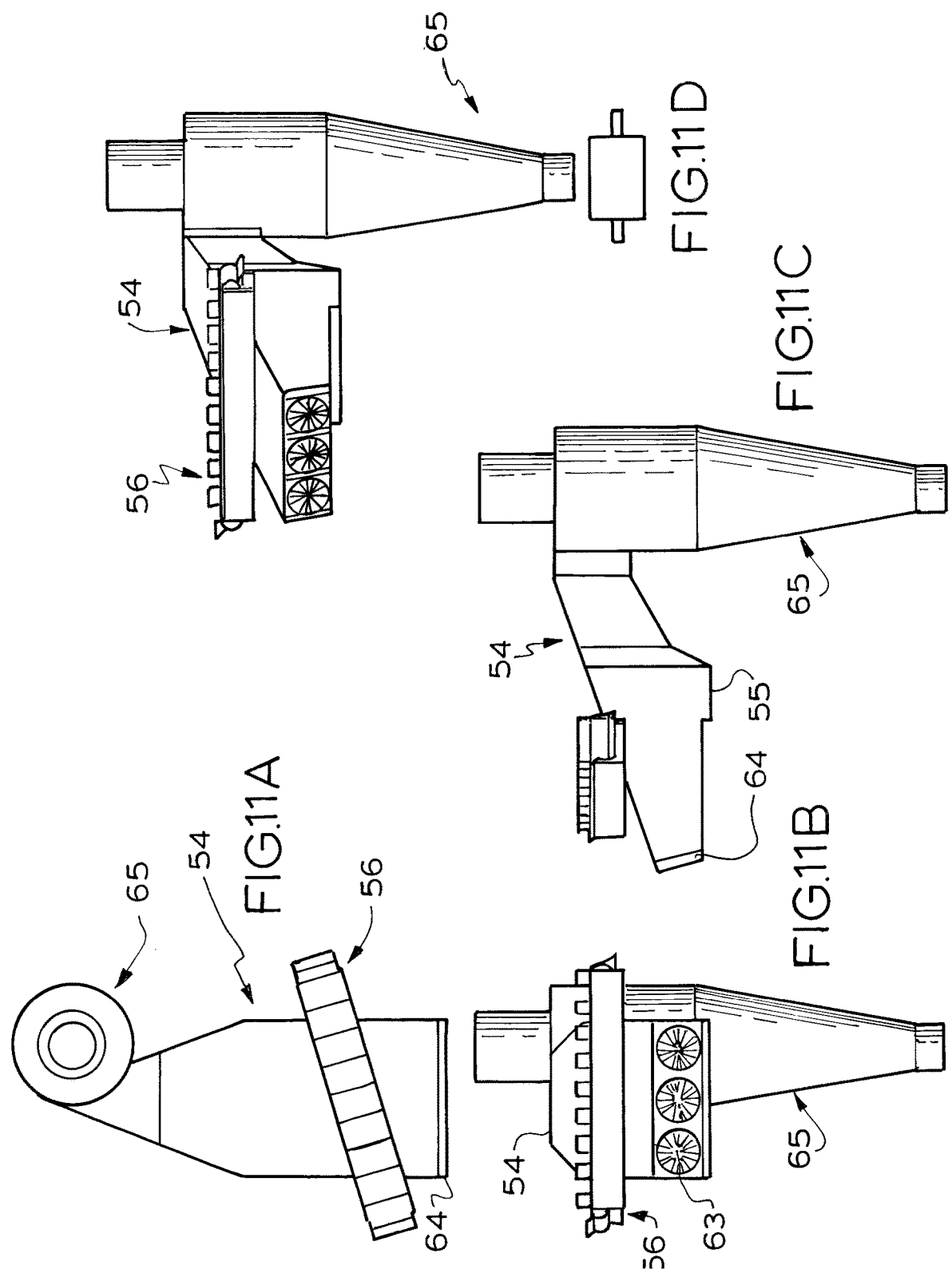

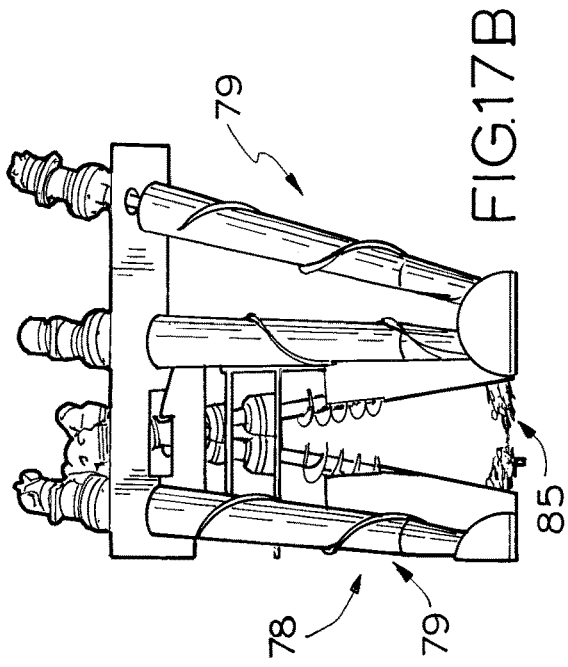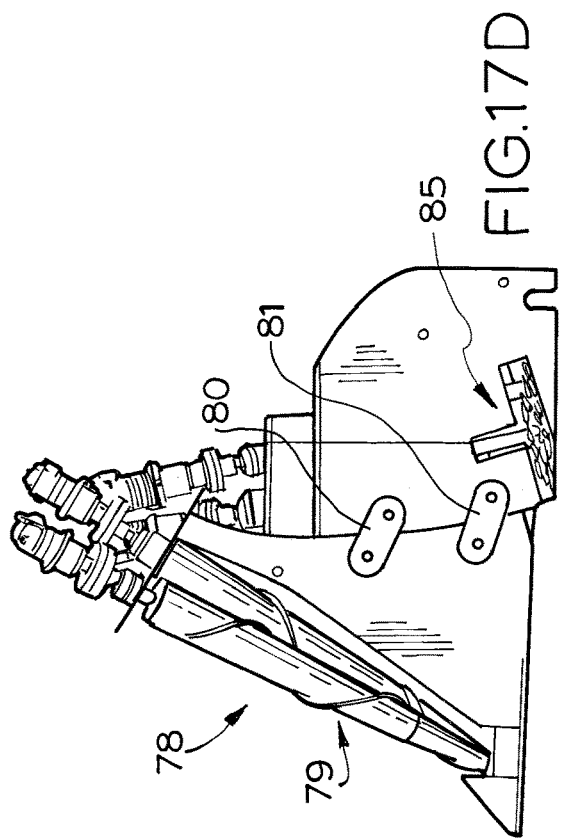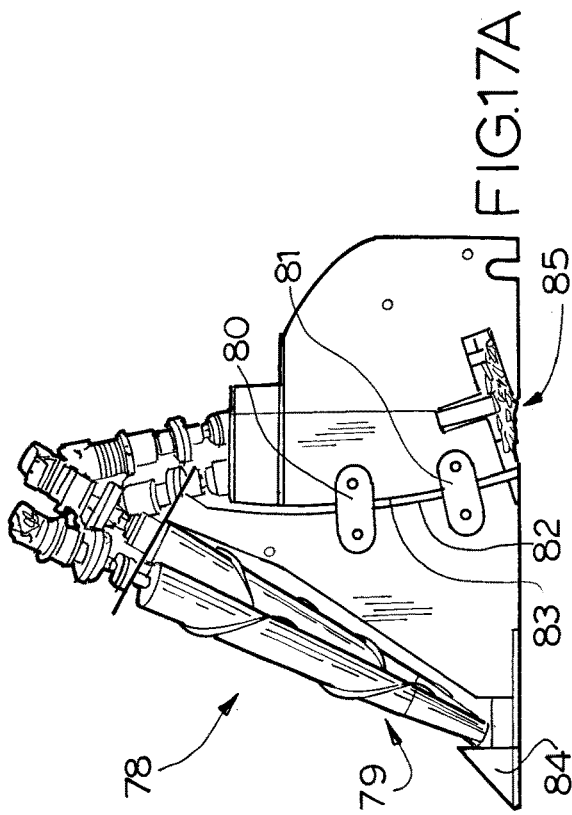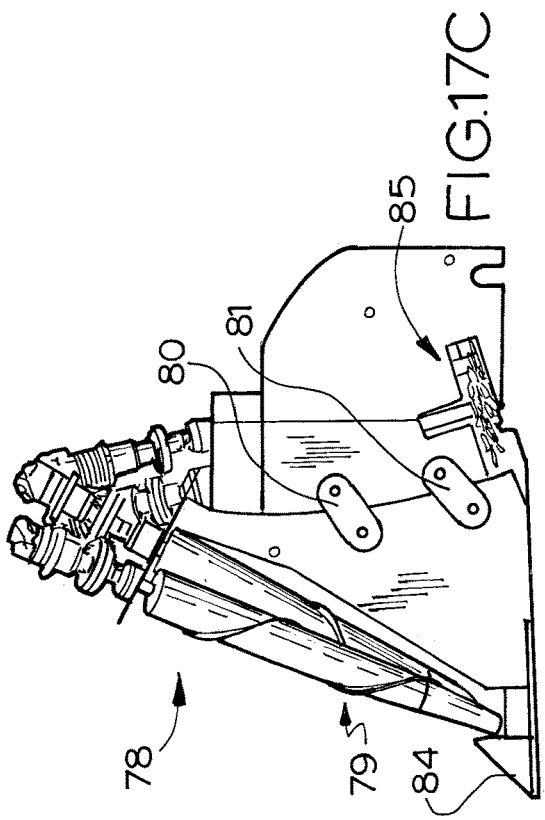

SUGAR CANE HARVESTER FOR WHOLE CANE

TECHNICAL FIELD

THIS INVENTION relates to pre-processing of sugar cane and in particular but not limited to improvements in harvesting, trash separation and washing as a process prior to milling.

BACKGROUND

Sugar cane is the world's largest crop and is grown mostly in tropical regions with high rainfall. Brazil is by far the highest cane producer. It is believed that cultivation first started in India in 327BC but may have been as early as 8000 BC. Sugar cane was harvested by hand until the first Massey Ferguson chopper harvester was produced in 1958 at Ingham in Queensland, Australia. The cane was fired in the usual way before harvesting. Over the following years local farmers assisted development notably with the addition of power feeders, blowers and extractors. The effect of these additions may be seen as a cloud of trash being thrown into the air and floating on the prevailing wind. This waste is rendered amorphous and it is not readily apparent whether actual juice bearing cane is being trashed. Hand harvesting is still used in some countries. It would be desirable to provide an economical and efficient mechanical alternative in these countries.

Under this scheme of disposing of trash infield, which remains in the norm in mechanised harvesting to this date, the cane is pre-processed and billeted by the harvester and is delivered to the mill substantially ready for milling. Logic would have it that this is very efficient. It is counter intuitive to think that there are any real problems associated with this idea.

However, Applicant has recognised that this may not be so. What if the so called "trash" is not all trash. Since the so called trash exits the harvester as an amorphous "cloud" how can one be certain that over time commercial quantities of valuable cane is not being inadvertently processed as "trash".

Applicant has considered the operation of existing harvesters and in hindsight the amount of wasted cane should depend on the harvester speed. The faster the blowers and extractors are driven the more cane is likely to be lost.

Applicant has also realised that it is also counter intuitive to conclude that the obvious solution is a reduction in speed and this will ultimately benefit collection efficiency since lower speed means less trash is ejected. Applicant observes that there are downstream consequences of more trash as it means more trash and dirt to the factory increasing trash and dirt loading and wear at the mill as well as greater requirements for vacuum separation and clarification due to excess mud. The balance can be hard to achieve as the actual infield environs are also variable.

In order to improve the overall effect is in Applicant's counter intuitive proposal to collect all cane infield and then centralise the trash removal in a more controlled way prior to further process. The recognition of this idea is Applicant's main invention. Accompanied with this invention is a practical application of it with implications arising from it in terms of equipment design and function, notably in new harvester design, trash separation/removal and cane washing. These represent further inventions in their own right individually and in combination. Even though the harvester, trash separator and cane washer herein are independent, in implementing Applicant's process cane is treated by them so the treatment of the cane before and after creates a working interrelationship between them in terms of the process.

The harvester, trash separator and cane washer herein arise unexpectedly from first having in hand the revolutionary concept of infield whole cane mechanical harvesting. This is contrary to a long standing industry trend for trash removal infield.

A relatively recent patent for a conventional harvester is described in U.S. Pat. No. 8,240,115 dated 2012. There are a very large number of patents dealing with infield cane harvesters. A non-exhaustive and fairly random list spread over time shows the dominance of infield trash separation and would include from 1972 U.S. Pat. No. 3,673,774; from 1978 U.S. Pat. No. 4,098,060; from 1982 U.S. Pat. No. 4,343,140; from 1985 U.S. Pat. No. 4,555,896; from 1992 U.S. Pat. Nos. 5,092,110 and 6,363,700. They are all along this basic theme of trash removal infield. They tend to be all very complex due to having to remove the leafy material from the cane stalks.

These and the others should be referred to in order to demonstrate that in all the circumstances the notional skilled person would be presented with many similar solutions in an old, mature and crowded art yet Applicant's invention escaped the skilled person over these many years. Since the present invention arises in a crowded art it would be prima facie wrong to suggest that there was, or is, a particular problem or motivation extant at the filing date of the present application that would give rise to the non-inventive notional person coming up with the present invention either in idea, concept or practical form. Thus the recognition and the present conception may be considered as whole or part of Applicant's inventive step.

With this and the other background factors, including as set out above, in mind, it should be clearly appreciated to the reader, that it is elementary that exercise of the inventive faculty in all the circumstances, in such a crowded art, is likely to be present in small variations. This is a background observation in hindsight only and is not to say that any of Applicant's new features whether individually or in combination are in any way slight or small.

Even though the art has become crowded, according to Applicant's understanding of the marketplace if there have been many offerings, they have not been widely accepted in the field of cane harvesting.

Consequently, there is a requirement for a fresh look "outside the box" through new eyes in an effort to provide an alternative to the efforts made over the last many years. It would be desirable to have something that is simple and easy to assemble, yet effective, but employing common techniques and methods to arrive at a new and useful combination and result. Simplicity, is not considered a bar to invention but in a crowded art may indeed be an indicator of invention.

This means that the present invention does not arise through any deterministic relationship to the prior art but rather is the inventor's own inspiration in an individualistic way applying the inventor's mind to the general state of the art and to the inventor's knowledge and recognition of defects arising including during his prototyping and development that might be remedied, this being as an alternative to what is currently available, rather than an effort to deal with any specific generally recognised real extant problem common at the time or any notional problem derived ex post facto from any single item of prior art, selected by hindsight, from a clearly crowded art, since any selection in a crowded art must necessarily be based on Applicant's disclosure as the starting point. Selection of features from what are otherwise workable solutions to match Applicant's claims must necessarily involve rejection of other features from the combinations disclosed in those solutions.

Outline

In one aspect there is provided a method for preparing sugar cane comprising the steps of:
1. mechanically cutting and collecting a batch of substantially whole cane infield;
2. delivering the batch of cane to a trash separator and subsequently separating trash from cane in the batch; and
3. delivering the trash separated cane for further processing.

Preferably, the process further involves the step of washing the trash separated cane.

In another aspect there is provided a system for pre-mill cane processing by infield whole cane harvesting using a whole cane harvester to prepare a batch of substantially whole cane; a trash separator for separation of trash to produce trash separated cane for further processing. Preferably, the system further employs a trash separated cane washer used to wash cane prior to milling.

As mentioned above one consequence of infield whole cane harvesting means a non-conventional harvester in so far as trash is not processed on the harvester. Thinking outside the prevailing norms means that the harvester does not need a trash extractor or a blower, again it is counter-intuitive but a consequence of no blower is a saving of infield fuel consumption. The present harvester does not require many of the features of a conventional harvester including conveyors and blowers.

Apart from the above omissions Applicant has made additional improvements in harvesters which may be employed individually or in combination. Each improvement is set out below independently and in combination it being appreciated that Applicant may divide the present improvements into separate patents.

In one improvement, in a cane harvester, there is provided an integrated modular feed system for removal and repair or for changing operative row width. In an example and a variation the harvester may be configured for cutting two rows, each row having a row feeder sharing a common billet cutter. Typically, the flow paths are tapering inwardly to the bill cutter.

In a second improvement, in a cane harvester, there is provided inclined cane base cutters with a forward downward angle of attack to cut close to the ground.

In a third improvement, in a cane harvester, there is provided a cane billet thrower to deliver cane billets and trash to an adjacent infield transporter.

In a fourth improvement, in a cane harvester, there is provided a floating front feed system for undulating terrain. Preferably, the feed system is made floating by a counter weight or force for the feed system. Typically, this may be any device to provide upward lift including chains, cables, springs hydraulic drives or the like. In the case of two row feeders, each row is preferably controlled independently. In one preferred form an adjustable length bias spring is employed and the feed system is pivotally mounted to the harvester.

In a fifth improvement, in a cane harvester, having a front end of a carriage there is provided a feed system extending from the front end, the feed system being adapted for elevation independently of the front end. The feed system typically employs a forward section upstream of base cutter blades, the forward section being floating relative to the angle of attack of the cutter blades. In a preferred form of this embodiment the forward section is made floating by reason of sets of spaced linkages guiding the front section between limits. The limits are typically provided by mating curved sections. The linkages connect to the curved sections which abut at upper and lower range of relative movement between the forward section and the cane base cutter blades. The blades are typically set at an inclined angle of attack with each blade formation generally following the edge of an inverted shallow dome configuration or equivalent.

In a sixth improvement, in a cane harvester, the harvester has a carriage comprising a prime mover and a chassis, and a transportation footprint, the footprint being within the boundaries of a shipping container, preferably a 20 ft shipping container.

In a seventh improvement, in a cane harvester, there is provided interdigitated spaced billet cutters having radially extending circumferentially spaced blades so dimensioned and arranged for lifting and passing stones of up to about 200 mm.

In an eighth improvement, in a cane harvester, there is provided billet chopper replacement blades adapted to slide out sideways for each for replacement.

In a ninth improvement, in a cane harvester, there is provided a shortened billeting and feed assembly comprising inclined feed conveyors, base chopper blades, a rotary conveyor, billet cutters leading onto a billet thrower.

In a still further improvement, in a cane harvester, there is provided a modular set up in a cane harvester as described herein where the harvester may be reconfigured as a boom sprayer.

In another aspect another is provided a trash separator or trash remover having an input conveyor for billets and trash which delivers the billets and trash through an entrance onto a curved grate through which air is driven to remove trash. The conveyor is preferably inclined to the axial line of the grate.

In a further aspect there is provided a cane washer having a washer tank having a billet inlet and billet outlet, an agitator/conveyor within the tank, a billet elevator communicating with the outlet, a liquid entry to the tank from downstream process and a return liquid collector below the elevator to return liquid to downstream process.

In a further aspect there is provided in a preferred embodiment, in a process as described above, a harvester as described, feeding a trash remover as described, in turn feeding a washer described.

BRIEF DESCRIPTION OF THE DRAWINGS

In order that the present invention, aspects and improvements may be more readily understood and put into practical effect reference will now be made to the accompanying drawings which illustrate preferred embodiments and wherein:

FIGS. 4 and 5 are end and side views of the harvester of FIG. 3;

FIGS. 6A through 6B are drawings illustrating the adjustable spring bias and raising features of the prime mover attached to the modular row feeder;

FIGS. 7A and 7B illustrate further details of that arrangement;

FIGS. 8A through 80C are drawings illustrating how cane is cut and billeted in the harvester according to the present invention;

FIG. 9 is a drawing of a billet cutter capable of passing quite large stones;

FIGS. 11A through 11D are further drawings of a trash remover according to the preferred form;

FIGS. 17A through 17D are drawings illustrating a preferred relationship between the front of the feed and billeting unit and its cutter blades.

METHOD OF PERFORMANCE

Figure 1:
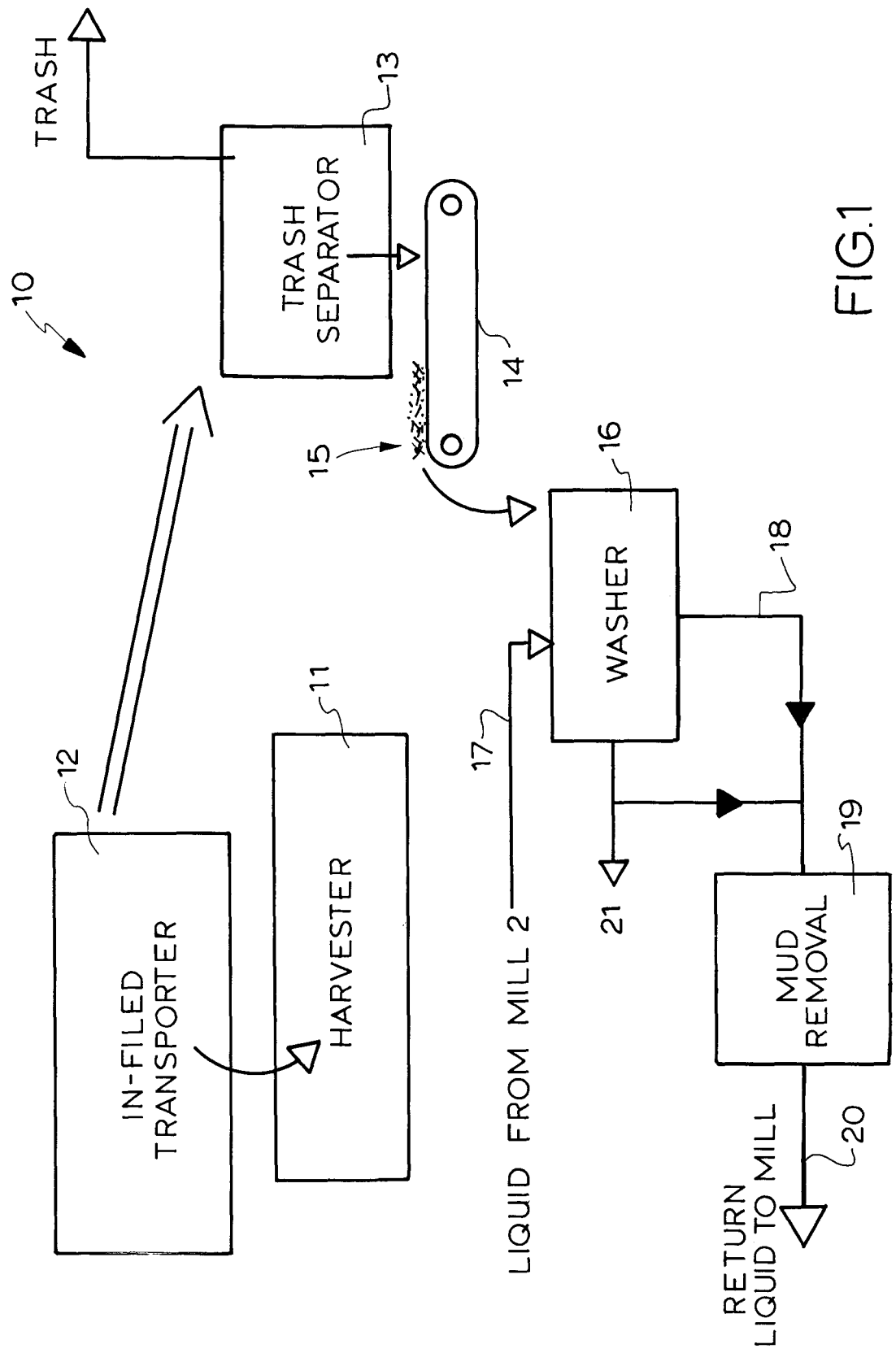
FIG. 1 is an overall schematic block diagram illustrating general application of the present invention in a preferred form.

Referring to the drawings and initially to FIG. 1 there is illustrated an overall system 10 for infield collection of whole cane and delivering that cane to a mill via a trash separator and a washer. In the embodiment illustrated a harvester 11 collects whole cane and throws billeted cane into an infield transporter 12 which then transports this to a centralised trash separator 13. Now it will be appreciated that this trash separator may service any number of infield transporters and may be located at the mill or at another centralised location so that output from the trash separator may pass on to a conveyor 14. Billets 15 are then fed to a washer 16 which in this embodiment is configured so that the washer is upstream of a mill. This means washing liquid from downstream process from say mill 2 in milling tandem may be used in the washer. This liquid enters the washer at 17. Mud and dirt is removed from the billets in return liquid at 18 which then passes to a mud removal unit 19 of conventional form. This juice is returned to the downstream process along line 20. It will be appreciated that since whole cane is being transported to a dedicated trash separator at 13 that there is very little loss in terms of juice carrying cane. The billets are moved on to the mill at 21. They will move to the first stage mill usually via a conveyor. Wash liquid may also be collected via an outlet conveyor from the washer.

Figure 2:
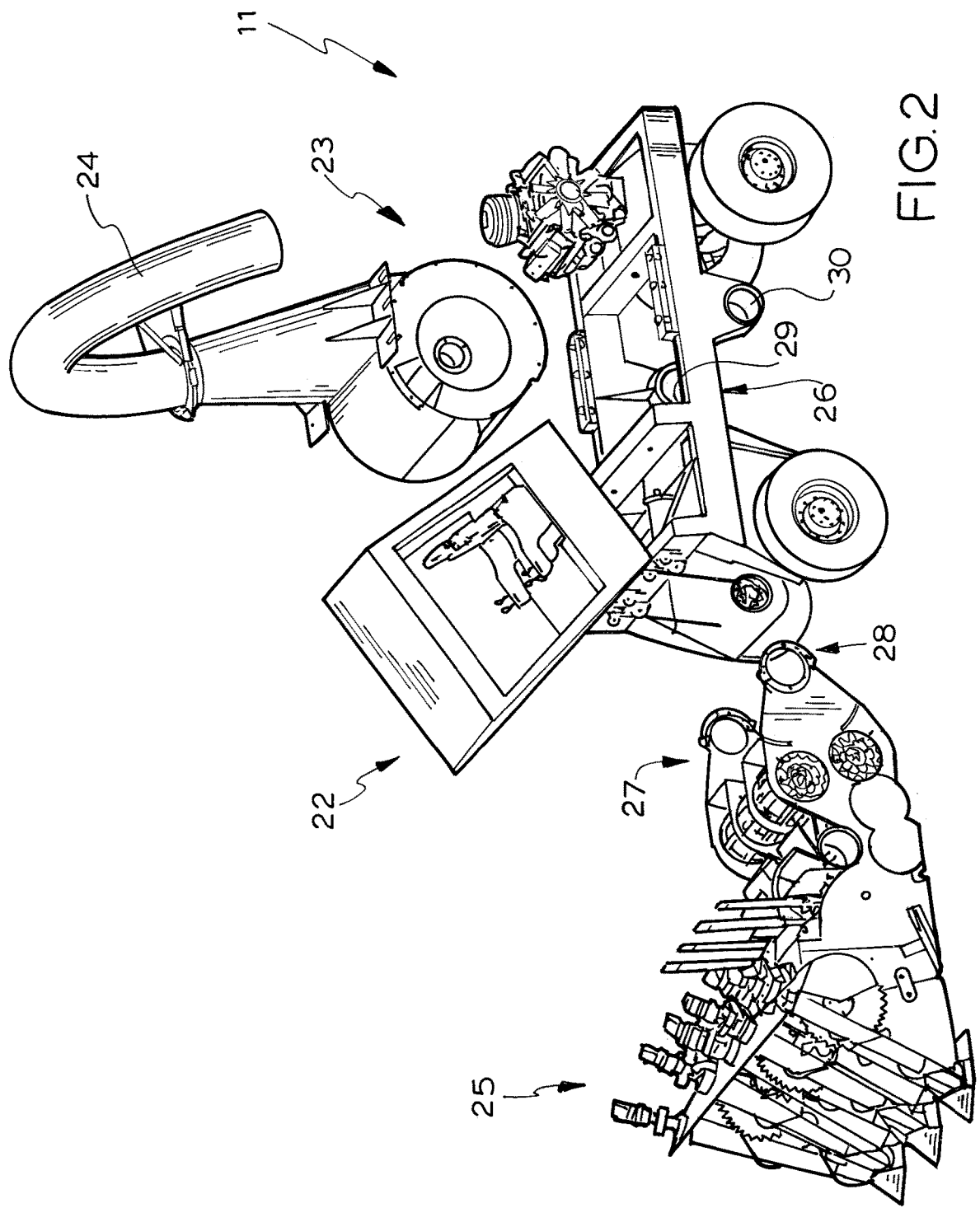
FIG. 2 is a drawing illustrating modular aspects of a typical harvester.

Referring now to FIG. 2 there is illustrated one example of a modular harvester 11 comprising a drive unit 22, a removable billet thrower and chute 23 and 24 and a feed and billeter module 25 in this case being a two row unit which may be inserted under the chassis 26 and secured by pivot couplings 27 and 28 to corresponding mounts 29 and 30.

Figure 3:
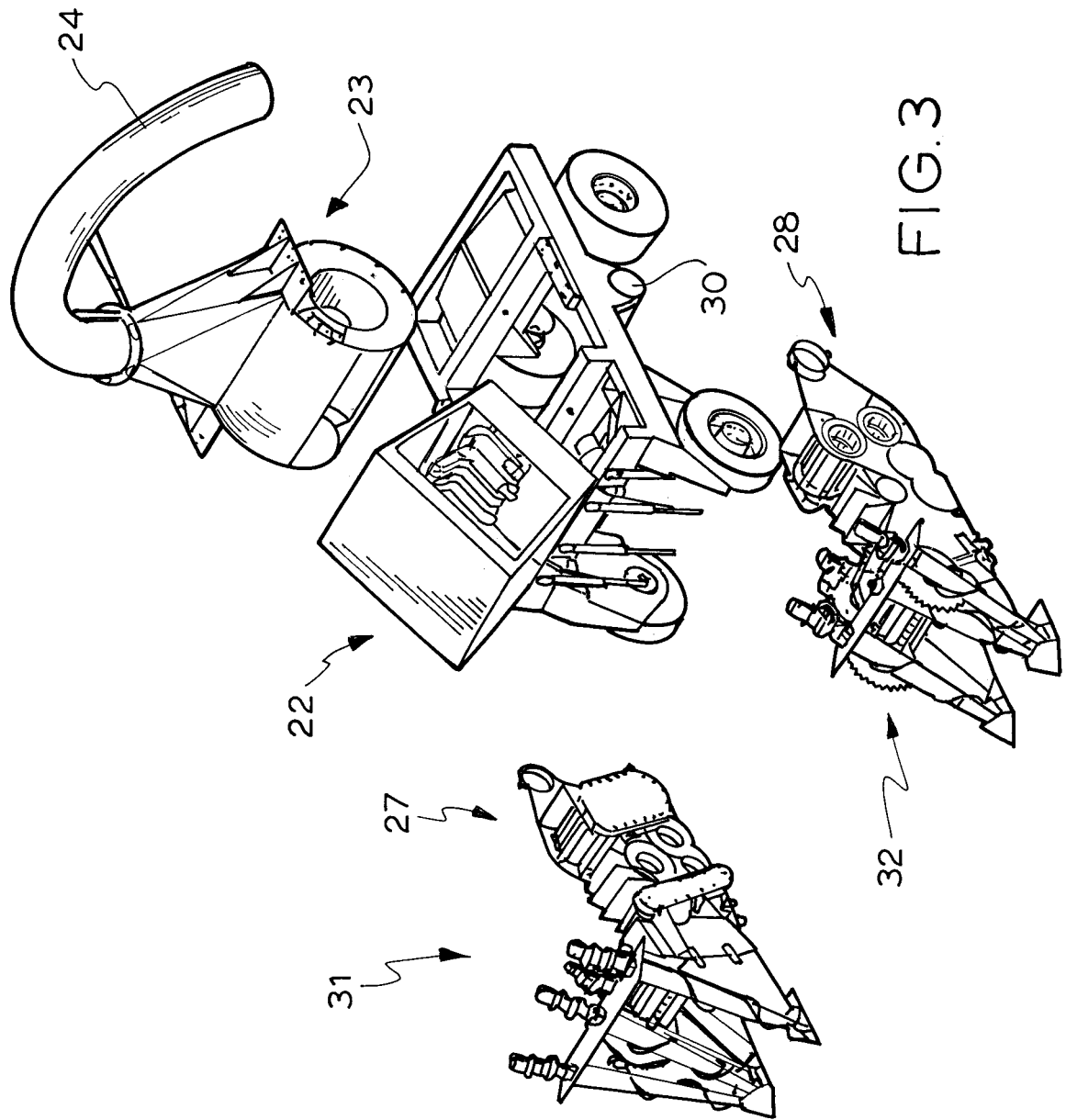
FIG. 3 is a drawing illustrating modular aspect of a two row harvester with independent modular feeders.

FIG. 3 illustrates single row modules 31 and 32 and like numerals illustrate like features it being appreciated that in this embodiment the single row feed and billeting units 31 and 32 may pivot independently of each other. This is illustrated in FIG. 4 where the module 31 is shown slightly higher in position relative to the module 32. The thrower 23 is shown in its operative position with the chute 24 delivering billets to the left hand side of the harvester.

The assemblies 25, 31 and 32 are arranged to float and follow the ground surface over which the harvester moves and to this end each of the assemblies is biased into floating contact with the ground by reason of one or more spring assemblies 33 which are more clearly illustrated in FIG. 6B. A wire rope 34 connects to an end plate 35 via a threaded adjuster 36. An adjustment nut 37 is used to regulate the length of the spring 38. It will be appreciated that there is some adjustment of the spring in order to regulate the floatability of the feeders. By reason of the spring there will be a damping and shock absorption action that will retain the entry of the feeding to the harvester at the front due to the connection of the wire rope 34 relative to the pivot connections at 29 and 30.

Quite independently of the spring assembly 33 are hydraulic ram assemblies 39, 40, 41 and 42 (part of which is shown) and these are used to elevate the feed units well away from the ground for transportation, servicing or for changing front wheels etc.

Referring now to FIGS. 8A through 8C operation of the harvester will be illustrated relative to cane shown at 42. As can be seen in 8B and 8C hydraulically driven feed augers shown generally at 43 lead cane along the section aligned with B-B as depicted in FIG. 8C. A blade 44 will cut any overlapping leaves between the two rows and then a paddle wheel 45 will force the cane to an angle of about 90° relative to inclined cutter blades 46. This and the angle of attack of the blades which will cut off the cane very close to the ground therefore maximising the length of cane above the ground to be retrieved. The cut end is fed into the billet cutter feeder assembly at 47 thus effectively inverting the cane stalk as it is fed into the billet cutters 48. The billets cut billets fall into the thrower 23 where they are ejected via the chute 24 into an infield transporter (not shown).

It will be appreciated that since there are no extractors or blowers then the trash is also fed along with the billets through the chute 24 into an infield cane transporter. The harvester can be made much shorter than conventional as there is a shorter travel of the cane through the harvester into the thrower. This permits containerisation of the harvester.

Since the cutter blades at 46 are inclined and are directed ostensibly at the very bottom of the cane stalks to cut them off, then there is a possibility that rocks and other debris might enter into the billet conveyor section. Consequently, the conveyor section also has rubberised fingers in, the paddle wheel at 49. The cutter blades at 48 as illustrated in FIG. 9 have their axles spaced so that the barrels 50 carrying the cutter blades 52 and the blades are so dimensioned and arranged that they may pass rocks up to, in this example, 211 mm with one such rock being illustrated by the circle at 53.

Figure 10:
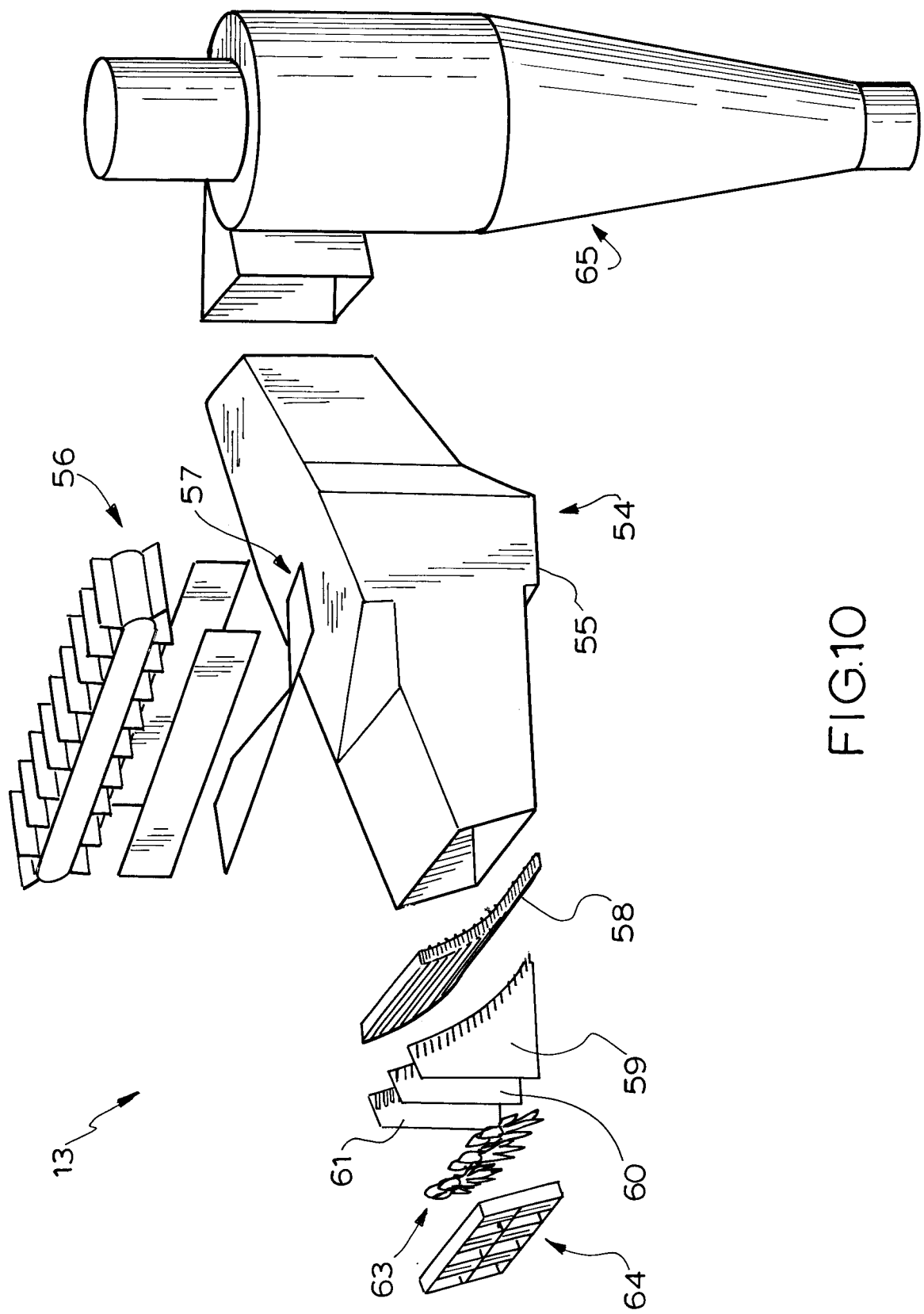
FIG. 10 is an exploded view of a trash separator/remover.
Figure 12C:
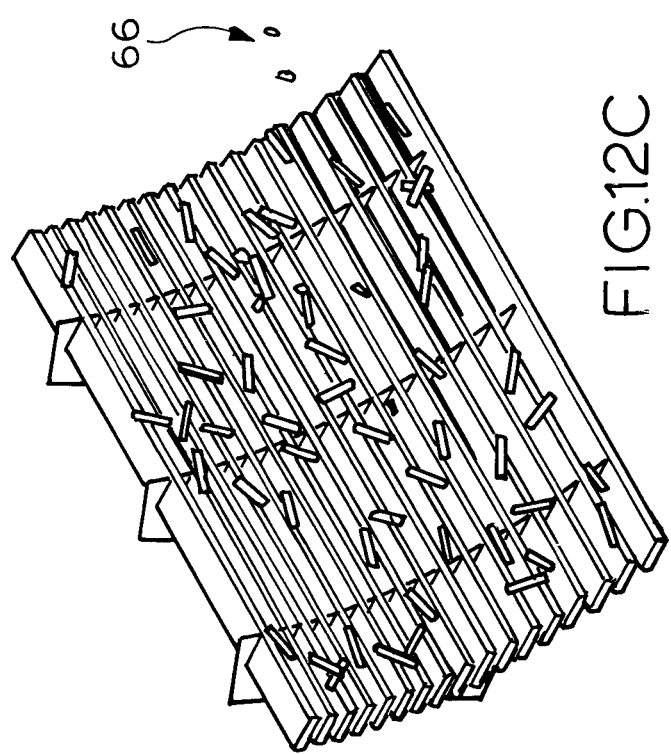
FIGS. 12A through 12D illustrate operation of part of the trash remover of the preceding figures.
Figure 12D:
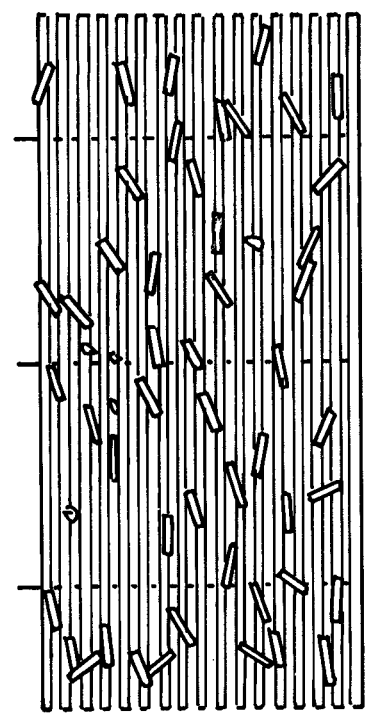
Figure 12A:
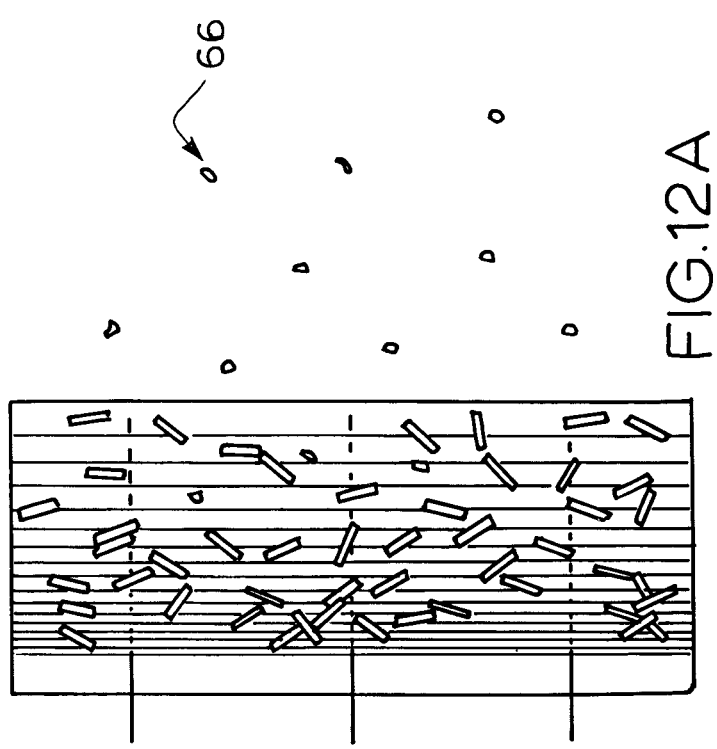
Figure 12B:
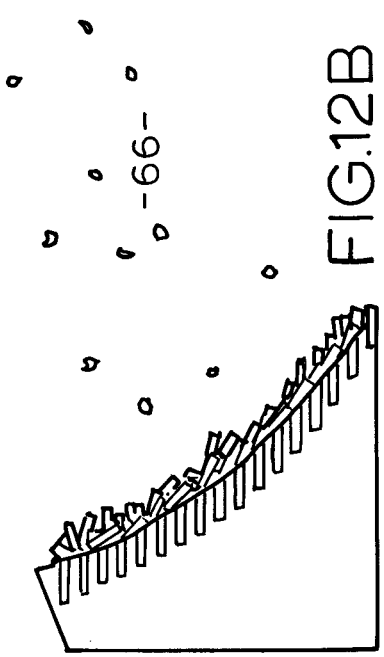

As shown in FIG. 1 once the cane has been harvested by the harvester 11, located in the infield transporter it is then sent to a trash separator or trash remover 13 and an example of a trash remover 13 is shown in exploded format in FIG. 10 with further details and operation being shown FIGS. 11A through 13C. The components of the separator include intermediate ducting 54 which has a gravitational input and an output at 55 for billets. These fall on to a conveyor 14.

In this case there is an input conveyor for billets and trash at 56 which delivers the billets and trash through an entrance to the ducting 54 at 57. Inside the ducting is a curved separator grate 58 which exposes the lighter trash to a regulated air flow. The grate is carried by grate support plates 59, 60 and 61. Blower fans at 63 draw air through inlet at 64. This arrangement of fans driven at an appropriate flow rate will provide removal of trash as billets progressively fall down and along the grate, travel around the curvature of the grate by gravity. The trash is blown off for collection in the cyclone at 65 and subsequent shredding.

Figure 13C:
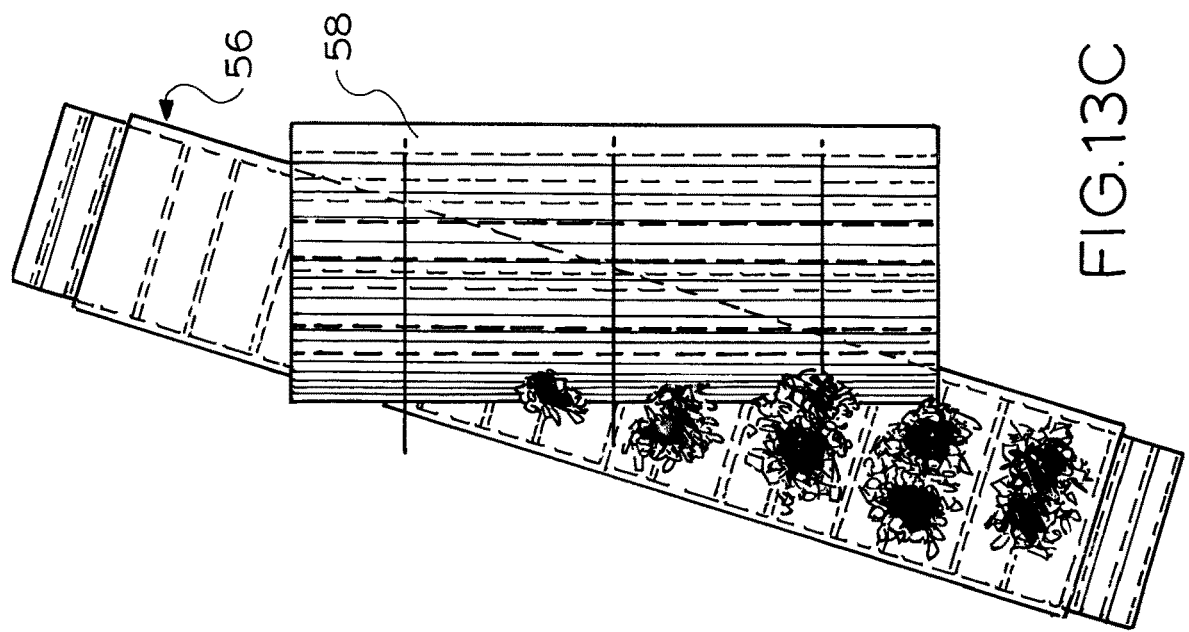
FIGS. 13A through 13C are views illustrating a billet conveyor that feeds billets by gravity through the trash remover of the preceding figures.
Figure 13B:
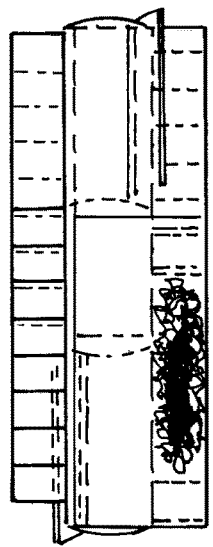
Figure 13A:
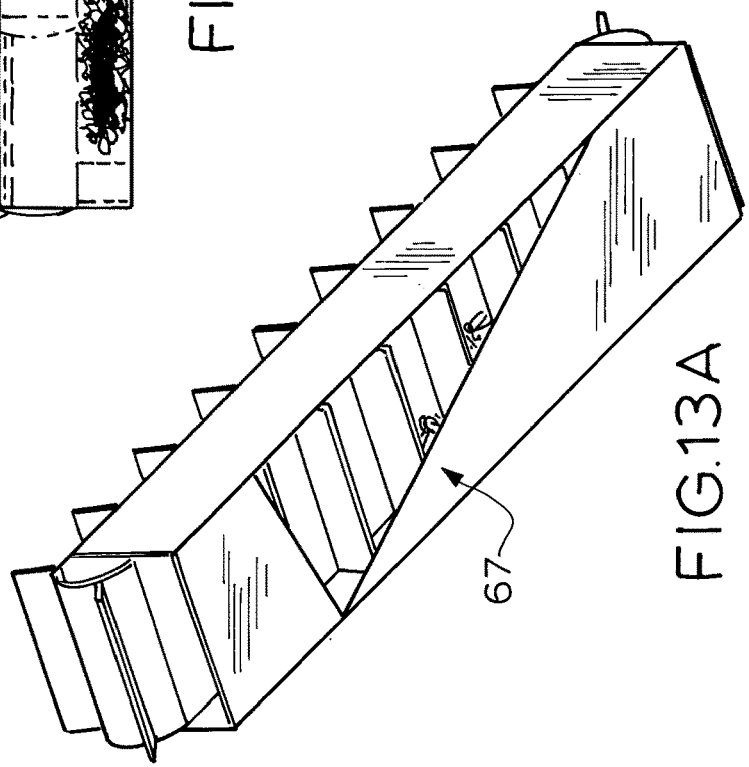

The relative position of the conveyor 56 is shown in plan view in FIG. 11A and as can be seen it is inclined to the axial line of the ducting 54 and also inclined to the direction of the grate 58 with the relative arrangement of these shown in FIG. 13C. The underside of the conveyor as shown in FIG. 13A showing the gravitational exit opening at 67 for the billets being carried by the conveyor. This exit opening locates and traverses the curved grate 58 as clearly depicted in FIG. 13C. This opening relative to the billet conveyor effectively widens over the grate and allows for even flow of the billets across the full width of the grate 58. This even flow means that there is an even distribution of clearing air flow to blow trash away from the cane billets. This air flow is typically around 11 metres per second. This is illustrated with the trash particles shown at 66 in FIGS. 12A through 12D.

Figure 14:
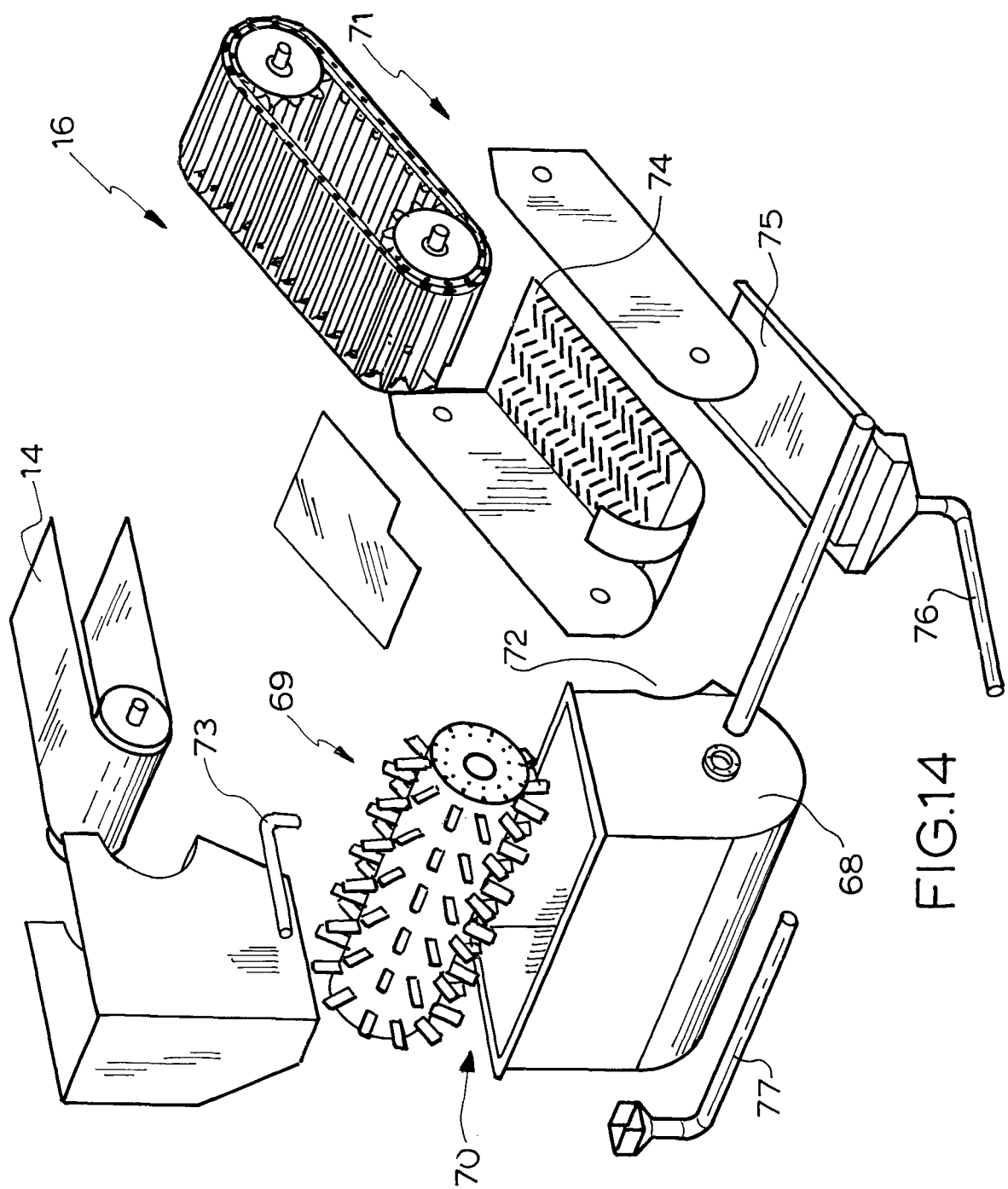
FIG. 14 is an exploded view illustrating a washer unit according to the present invention.
Figure 15B:
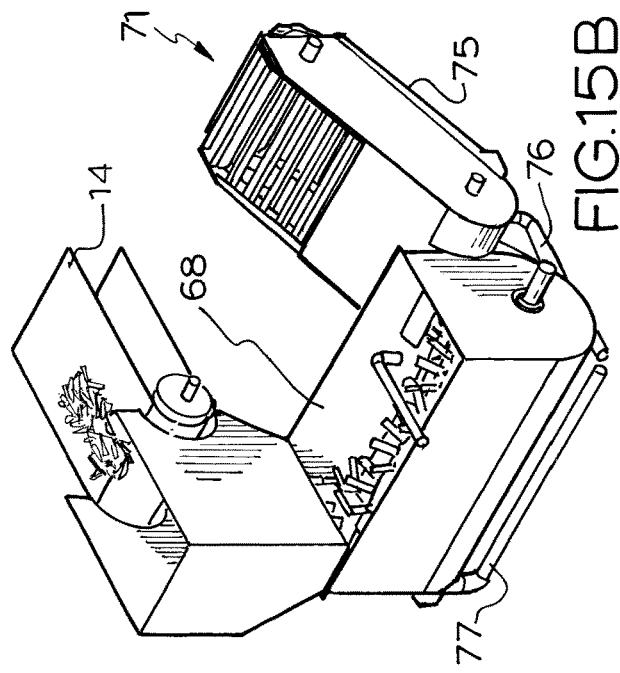
FIGS. 15A through 15D illustrate different views of the billet washer of the preceding figures.
Figure 15D:
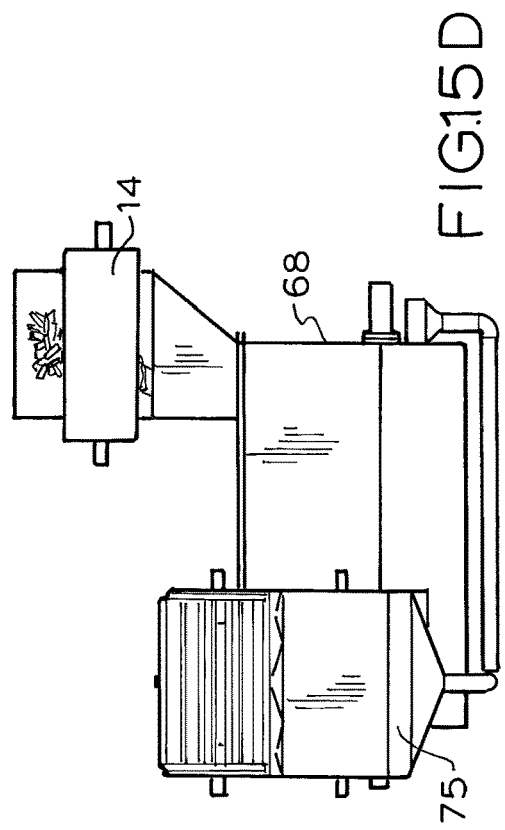
Figure 15A:
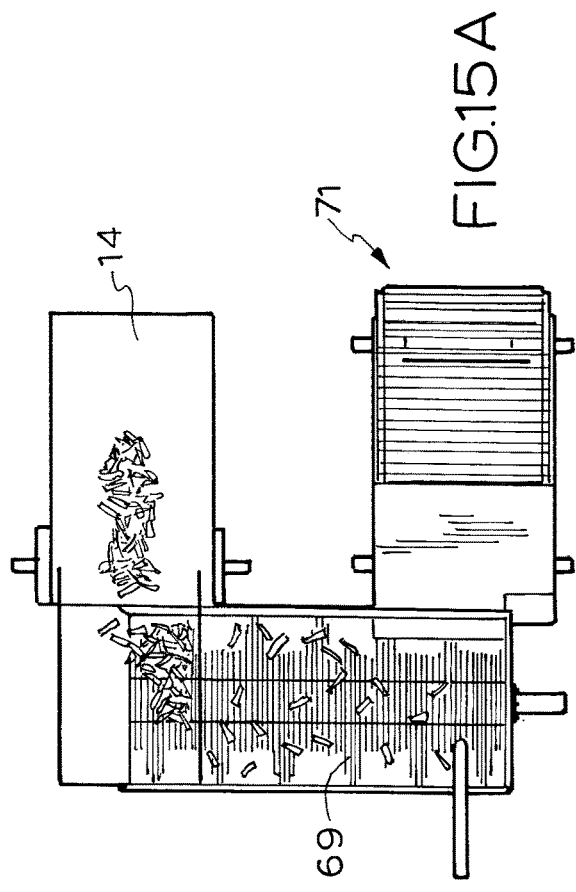
Figure 15C:
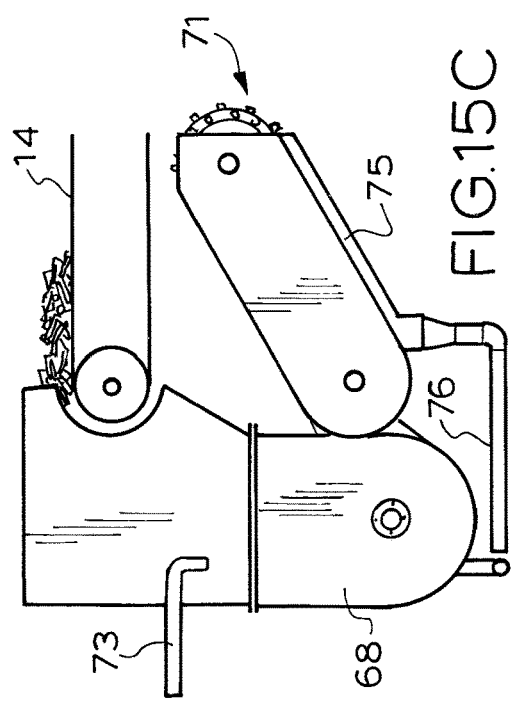
Figure 16B:
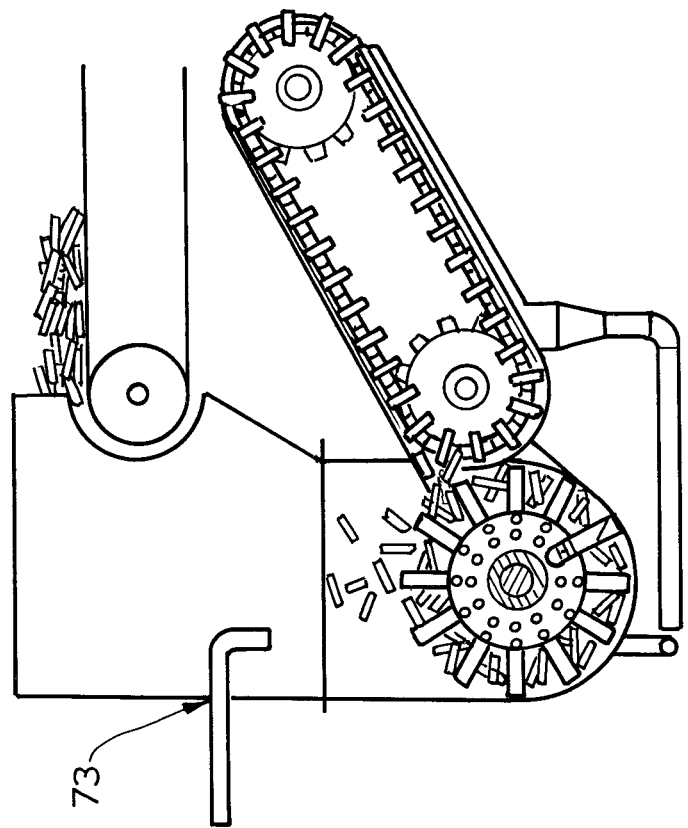
FIGS. 16A through 16B are drawings of an end view of a typical billet washer and a section through A-A of FIG. 16A.
Figure 16A:
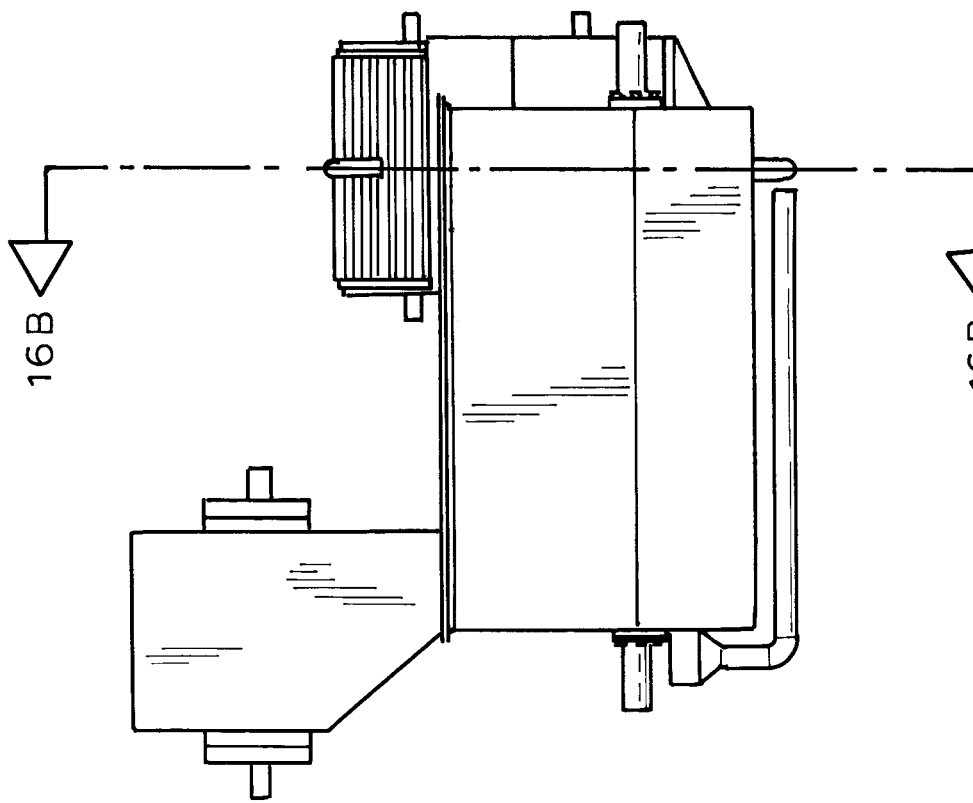

As further is shown in FIG. 1 as the trash removed billets leave the trash separator they move on to a conveyor 14. They are conveyed to a washer 16 details of which are shown in exploded view in FIG. 14 and through FIG. 16B. A washer tank 68 holds a mixer, agitator 69, with helical mounted blades 70 so that cane falls into one end of the tank 68 where it is propelled and agitated toward the other end. Here the billets are pulled onto an elevator assembly 71 with the bottom of the elevator travelling through the end at 72.

Relatively clean low brix juice from the number 2 mill in a milling tandem is heated to about 100° C. and is used in the washer entering at 73. The agitator speed is about 6 m/s to break up clods of dirt in cane roots. Relatively dirty return juice flows through a perforated plate 74 in the elevator assembly in collector tray 75 and also through drain 77 where it is returned back to process.

Referring now to FIGS. 17A through 17D there is illustrated another preferred embodiment of a front end section 78 of a feed and billeting module, similar to the module 25. In this case the module has its cane lead-in conveyors 79 mounted to float by reason of sets of spaced linkages 80 and 81 (one set being shown in the drawings).

The linkages are shown connected to mating curved sections 82 and 83 which abut at upper and lower range of relative movement between the front and the cane base cutter blades 85 (FIGS. 17C and 17D). A typical range is illustrated in the drawings in mm at 30 mm (mid range), 88 mm (lower range) and 95 mm (upper range).

Thus the front 85 may cater for different row variations including furrows or hilled rows.

The blade sets 85 in this embodiment are forwardly inclined but as may be discerned from the side views of 17A, 17C and 17D the blade formation generally follows the edge of an inverted shallow dome configuration or equivalent.

Figure 18A:
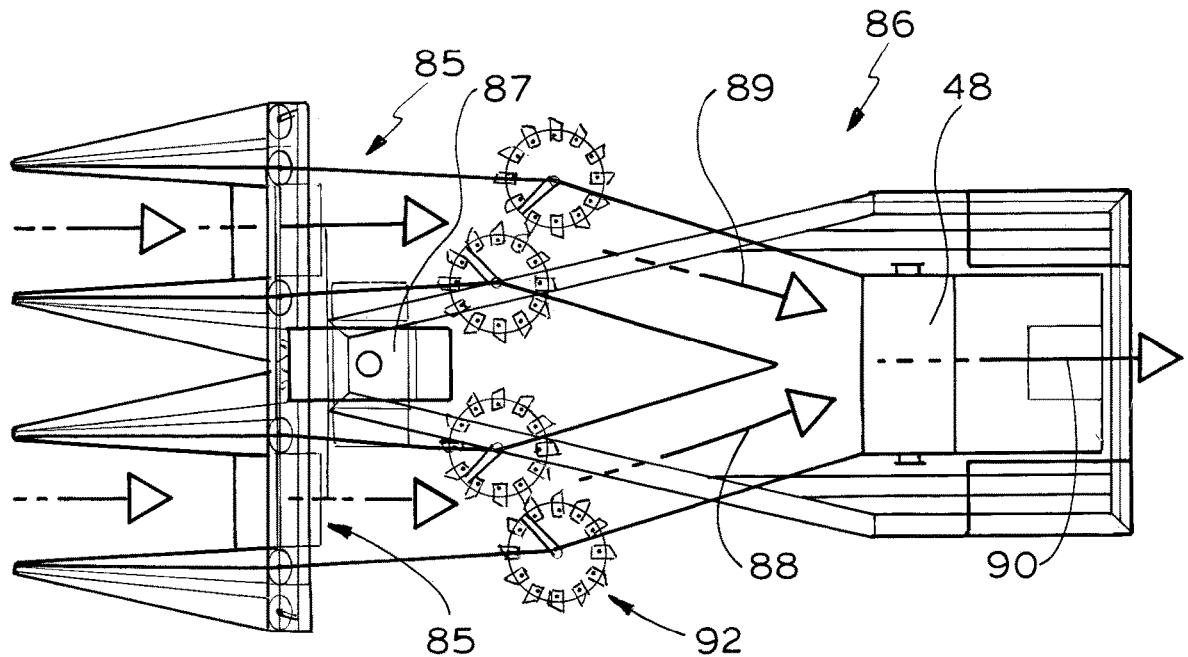
FIGS. 18A and 18B are top and side schematics of a variation employing a single module for two rows.
Figure 18B:
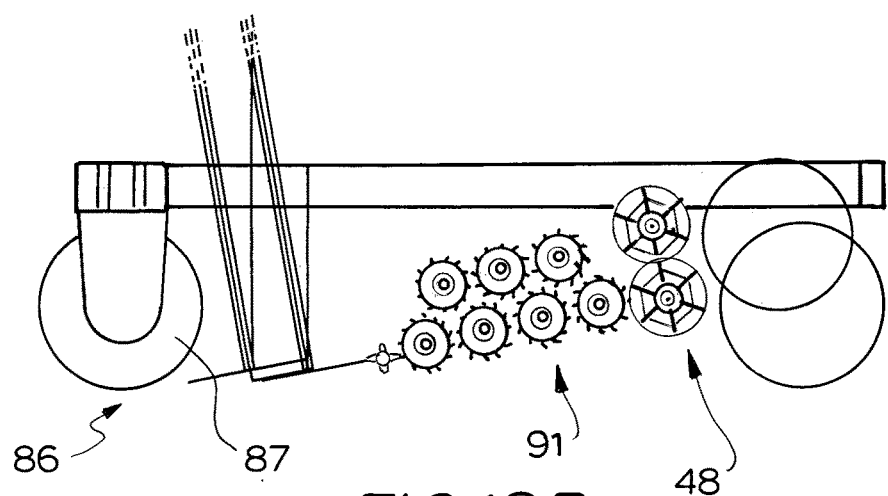

Whilst the above has been given by way of illustrative example many variations and modifications will be apparent to those skilled in the art without departing from the broad ambit and scope of the invention as set out in the appended claims. For example, FIGS. 18A and 18B illustrate a simplified schematic of a variation where rather than each row having its own module this is a two row module and chassis assembly 86, in this case for a 1.8 m row spacing, the cutters 85 are used, and the basic feed is the same but the rows are fed into a common billet cutter 48 that they share. The chassis has a single front wheel 87 to aid turning. The cane flow path is indicated by the lines 88 and 89 which then come together into a single stream at 90. The billet thrower and chute 23 and 24 of the previous embodiments (not shown here) is also fitted as a module. The feed arrangement is shown in part in FIGS. 18A and 18B at 91 and 92 so there are separate feed systems for each row but these have an inward taper to match lines 88 and 89. The feed systems themselves may be conventional or may be configured as previously described in terms of each feed stage, although there will usually be additional feed rollers at 91 as there may be a slightly longer path to the billeter. The feed systems are removable as a pivoting module as before and they also float as before. The taper ensures that the chassis and the parts making up the harvester may still all be fitted into a 40 foot shipping container. The skilled person will readily understand all the optional variations.

It will be further appreciated that the main objective of one form of the invention is to collect cane juice that is inadvertently left behind by the prior art harvesters when trying to separate cane stalks and leave trash, so whole cane as referred to here is not to be taken literally but means substantially whole cane as captured by the present invention compared to the prior art, since inevitably some of the cane leaves and stalks will be left infield no matter how efficient a process is. Whole cane effectively herein means greater efficiency overall rather than literally whole cane plants.

What is claimed is:

1. A cane harvester for mechanically cutting and collecting a batch of cane infield for an infield cane transporter, the harvester comprises a drive unit, a feed system and chopper, characterised in that the harvester lacks a cane stripper and downstream of the chopper is a thrower such that substantially whole cane is harvested and delivered to the infield transporter; and wherein the chopper is a billeter and the thrower is a cane billet thrower.

2. A cane harvester according to claim 1 wherein the feed system is an integrated modular feed system for removal and repair.

3. A cane harvester according to claim 1 wherein the feed system includes inclined cane base cutters with a forward downward angle of attack to cut close to the ground.

4. A cane harvester according to claim 1 wherein the feed system is a floating front feed system for undulating terrain.

5. A cane harvester according to claim 1 wherein the feed system is a floating front feed system for undulating terrain, the feed system is made floating by a counter weight.

6. A cane harvester according to claim 1 wherein the feed system is a floating front feed system for undulating terrain, the feed system is made floating by provision of upward lift to offset load on the feed system.

7. A cane harvester according to claim 1 wherein the feed system is a floating front feed system for undulating terrain, the feed system is made floating by provision of upward lift to offset load on the feed system, the feed system comprising two row feeders, each row feeder floating independently, wherein an adjustable length bias spring is employed, and wherein the feed system is pivotally mounted to the harvester.

8. A cane harvester according to claim 1 wherein the feed system is a floating front feed system for undulating terrain, the feed system is made floating by provision of upward lift to offset load on the feed system, the feed system comprising two row feeders, each row feeder floating independently and being pivotally mounted to the harvester.

9. A cane harvester according to claim 1 having a front end of a carriage, the feed system extending from the front end, the feed system being adapted for elevation independently of the front end, the feed system employing a forward section upstream of base cutter blades, the base cutter blades having an angle of attack for close to ground cutting, the forward section being floating relative to the angle of attack of the cutter blades.

10. A cane harvester according to claim 1 having a front end of a carriage, the feed system extending from the front end, the feed system being adapted for elevation independently of the front end, the feed system employing a forward section upstream of base cutter blades, the base cutter blades having an angle of attack for close to ground cutting, the forward section being floating for undulating ground relative to the angle of attack of the cutter blades, the forward section is made floating by reason of sets of spaced linkages guiding the front section between limits.

11. A cane harvester according to claim 1 having a front end of a carriage, the feed system extending from the front end, the feed system being adapted for elevation independently of the front end, the feed system employing a forward section upstream of base cutter blades, the base cutter blades having an angle of attack for close to ground cutting, the forward section being floating for undulating ground relative to the angle of attack of the cutter blades, the forward section is made floating by reason of sets of spaced linkages guiding the front section between limits provided by mating curved sections, the linkages connect to the curved sections which curved sections abut at upper and lower range of relative movement between the forward section and the cane base cutter blades.

12. A cane harvester according to claim 1 wherein the feed system includes inclined cane base cutters with a forward downward angle of attack to cut close to the ground, the blades being set at an inclined angle of attack with each blade formation generally following the edge of an inverted shallow dome configuration.

13. A cane harvester according to claim 1 wherein in a cane harvester, the harvester has a carriage comprising a prime mover and a chassis, and a transportation footprint, the footprint being within the boundaries of a shipping container.

14. A cane harvester according to claim 1 wherein the chopper is a billeter having interdigitated spaced billet cutters having radially extending circumferentially spaced blades so dimensioned and arranged for lifting and passing stones of up to about 200 mm.

15. A cane harvester according to claim 1 wherein there is provided billet chopper replacement blades adapted to slide out sideways for replacement.

16. A cane harvester according to claim 1 wherein the feed system comprises a shortened billeting and feed assembly comprising inclined feed conveyors, base chopper blades, a rotary conveyor, and billet cutters leading onto a billet thrower.

17. A cane harvester according to claim 1 wherein the harvester has a modular setup on a prime mover and carriage, the feed system being a removable module and the thrower being a removable module so that the prime mover and carriage may be repurposed for other uses by removing the modules.

18. A cane harvester according to claim 1 wherein the feed system is an integrated modular feed system with interchangeable modules.

19. A cane harvester according to claim 1 for cutting two rows, each row having a row feeder sharing a common billet cutter.

20. A cane harvester according to claim 1 for cutting two rows, each row having a row feeder sharing a common billet cutter, and flow paths tapering inwardly to the billet cutter.

* * * * *